United States Patent
Chaudhari et al.

(10) Patent No.: US 7,249,263 B2
(45) Date of Patent: Jul. 24, 2007

(54) METHOD AND SYSTEM FOR USER AUTHENTICATION AND IDENTIFICATION USING BEHAVIORAL AND EMOTIONAL ASSOCIATION CONSISTENCY

(75) Inventors: Upendra V. Chaudhari, Briarcliff Manor, NY (US); Jiri Navratil, White Plains, NY (US); Ganesh N. Ramaswamy, Ossining, NY (US); Ran D. Zilca, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 10/627,938

(22) Filed: Jul. 25, 2003

(65) Prior Publication Data

US 2005/0022034 A1 Jan. 27, 2005

(51) Int. Cl.
*H04L 9/32* (2006.01)
*H04L 29/02* (2006.01)

(52) U.S. Cl. ........................................ 713/186; 713/184
(58) Field of Classification Search .................. None
See application file for complete search history.

(56) References Cited

U.S. PATENT DOCUMENTS 5,696,964 A * 12/1997 Cox et al. ...................... 707/5
2002/0147509 A1* 10/2002 Sameshima et al. .......... 700/32
2003/0074317 A1* 4/2003 Hofi ............................. 705/44
2003/0154406 A1* 8/2003 Honarvar et al. ........... 713/201
2004/0177030 A1* 9/2004 Shoham ....................... 705/38
2005/0043096 A1* 2/2005 Kerr ............................. 463/42
2005/0262086 A1* 11/2005 Ta et al. ........................ 707/9

* cited by examiner

*Primary Examiner*—Gilberto Barrón, Jr.
*Assistant Examiner*—Venkat Perungavoor
(74) *Attorney, Agent, or Firm*—Scully, Scott, Murphy & Presser, P.C.; Derek S. Jennings

(57) ABSTRACT

A system and method for determining and authenticating a person's identity by generating a behavioral profile for that person by presenting that person with various stimulus and measuring that person's response characteristics in an enrollment stage. That person's response profile, once generated is stored. When that user subsequently needs to access a secure resource, that user to be authorized is presented with the stimulus that was presented at the time of generating that person's behavioral profile and the person's responses are detected and compared to his/her behavioral profile. If a match is detected, that user is identified. The user's behavioral response may be in the form of signals as detected by sensor means that detects visual or audible emotional cues or as signals resulting from that person's behavior as detected by polygraph or EEG devices.

14 Claims, 1 Drawing Sheet

METHOD AND SYSTEM FOR USER AUTHENTICATION AND IDENTIFICATION USING BEHAVIORAL AND EMOTIONAL ASSOCIATION CONSISTENCY

BACKGROUND OF THE INVENTION

1. Field of the Invention

The present invention generally relates to user authentication and identification methods, i.e. methods and apparatus for determining the identity of a user. More specifically, the invention relates to the ability to recognize the identity of a speaker given a sample of his/her voice.

2. Description of the Prior Art

The field of personal identification includes a recognition or authentication aspect which entails verifying a claimed identity, and a recognition or identification aspect which entails determining the identity of a given person, e.g., from among a database of persons known to a system. There currently exists two major approaches for personal identification: a token-based approach requiring a user's possession of an identification device (e.g., a driver's license, door key), or a knowledge based approach requiring a user to possess a certain piece of knowledge (e.g. personal identification numbers or password). Knowledge-based and token-based approaches while effective, may be unsatisfactory for purposes of security in our information society as tokens may be stolen, misplaced or otherwise compromised and knowledge forgotten. Biometric identification refers to identifying an individual based on that person's distinguishing physiological and/or behavioral (e.g., a finger print or voice print). Biometrics have the good property of using an inherent attribute of the user (e.g. a fingerprint). However, for the same reason, biometrics suffer from the risk of the biometric template being compromised (e.g., a user's fingerprint imaged and duplicated).

It would therefor be highly desirable to provide a new kind of personal identification system that is extremely difficult to compromise.

SUMMARY OF THE INVENTION

The present invention solves the problem of authenticating or identifying a user accessing a system, e.g., a computer system, software, or service, whether remotely or locally, in a manner that is virtually impossible to compromise.

Particularly, the system and method of the invention is directed to a new kind of biometric identification system that utilizes the emotional and/or psychological profile of the user, which the user himself/herself may even be unaware of. Such kind of biometric identification is extremely difficult to compromise, since it would require a very skilled imposter simulate an authentic emotional and behavioral response.

In the system and method of the present invention, the identity of the user is determined by presenting him/her with audio stimuli such as spoken words, visual stimuli such as images, or olfactory stimuli such as scents. The user's emotional and/or behavioral response to the stimuli is measured. Since every stimulus would inflict a different emotional/behavioral response on different users, the emotional response of the user to the stimuli can indicate his/her identity. The suggested authentication and identification method determines the user's identity by evaluating how consistent the user's response is to similar stimuli, comparing to the user's emotional/behavioral profile as generated during a period referred to as "enrollment". Different kinds of stimuli may be used, for example spoken words, displayed images or movie clips, generated scents, artificial sounds, etc. The system and method of the present invention may also use, but is not restricted to, well know psychological stimuli such as the Rorschach test.

According to a preferred aspect of the invention, there is provided a system and method for determining and authenticating a person's identity by generating a behavioral profile for that person by presenting that person with various stimulus and measuring that person's response characteristics in an enrollment stage. That person's response profile, once generated is stored. When that user subsequently needs to access a secure resource, that user to be authorized is presented with the stimulus that was presented at the time of generating that person's behavioral profile and the person's responses are detected and compared to his/her behavioral profile. If a match is detected, that user is identified. The user's behavioral response may be in the form of signals as detected by sensor means that detects visual or audible emotional cues or as signals resulting from that person's behavior as detected by polygraph or EEG devices.

Advantageously, a person may be blindly identified using the authenticating procedures of the present invention. In such a case a person's identity may be determined by searching for a behavioral response profile that best matches the user's response to presented stimuli, either by a direct match or a projected match.

BRIEF DESCRIPTION OF THE FIGURES

The objects, features and advantages of the present invention will become apparent to one skilled in the art, in view of the following detailed description taken in combination with the attached drawings, in which.

DETAILED DESCRIPTION OF THE PREFERRED EMBODIMENTS

Similar to every authentication and identification system, the current invention incorporates two stages: an enrollment stage and a recognition stage. During enrollment, various stimuli are presented to the user and that user's behavioral response will be recorded.

Figure 1:
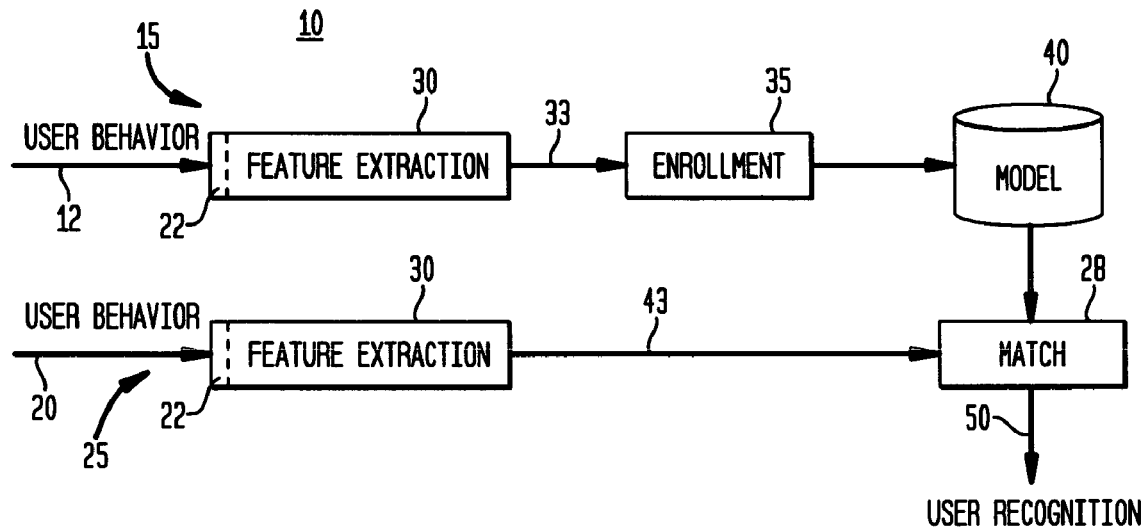
FIG. 1 illustrates the enrollment stage for obtaining the emotional and/or psychological profile of the user in the biometric identification system of the present invention.

FIG. 1 illustrates the biometric recognition system 10 of the present invention that is a two-stage process including an enrollment stage 15 leading to the generation of a behavioral model 40, and a recognition stage 25 which performs the user authentication/identification according to the invention. In the enrollment stage 15, which is applied, for example, as a condition of a user's employment or part of any security arrangement, contract or agreement requiring regular user recognition or verification, a stimulus is first applied to a user. A type of stimulus that may be applied to a user that may include, but is not limited to, one or more of: speech (e.g., spoken words, artificial sounds), exposure to visual stimuli (e.g., images, movie clips) or olfactory stimuli (e.g., generated smells or scents). In the enrollment period, depicted as stage 35, the user's reaction and/or behavior 12 is detected, for example, by a sensing means 22 and features from that user's response is extracted or measured by feature extraction devices 30 as depicted in FIG. 1.

Thus, during this enrollment period 35, the user's emotional response 12 to the stimuli is measured and a user's emotional/behavioral profile is generated as will be described in further detail herein. Depending on the stimuli, the user's responses 12 may be in the form of acoustic cues in the user's speech, visual emotional cues expressed on the user's face (i.e., facial expressions), or more elaborate cues similar to the ones as detected in polygraph machines (polygraph measurements) and Electroencephalographs (EEG measurements). In each case, the user's behavioral response is represented by features 33 that are extracted from the user's apparent behavior as detected by sensing means 22 and feature extraction device 30. As each stimuli inflicts a different emotional/behavioral response on different users, the emotional response of a user to the stimuli will indicate his/her identity which is performed each time user authentication/identification is performed during recognition stage 25. Particularly, as shown in FIG. 1, the biometric recognition system 10 generates a model 40 of the user's emotional and behavioral reaction to each different stimuli. In the recognition stage 25, in order to determine the user's identity once a behavioral model 40 is enrolled, the system applies identical or similar stimulus to the user 11. The enrolled user's behavior 20 is sensed and features 43 extracted by like sensing 22 and feature extraction devices 30. The resulting user's behavioral model 40 is compared to the demonstrated behavior 20. As a result of the comparison, if the two behaviors match as determined by a comparison or matching algorithms 28, the user's identity 50 is determined to be the same as the modeled one, i.e., the user is considered recognized.

In an alternate embodiment, the authentication and identification method determines the user's identity by evaluating how consistent the user's response is to similar stimuli, comparing it to the user's emotional/behavioral profile 40 as generated during the enrollment period 35. That is, a person's identity may be authenticated by presenting the person with different stimuli from the stimuli presented at the time of creating that user's behavioral profile, and projecting what is the expected behavioral response to the unseen stimuli based on his/her behavioral profile, and subsequently comparing the person's response to the expected response.

Figure 2:
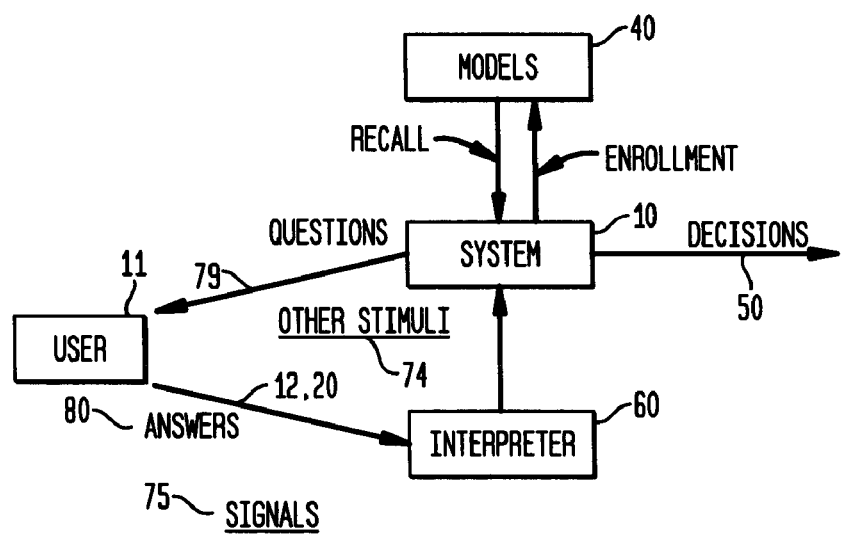
FIG. 2 is a diagram depicting the biometric identification system of the present invention.

FIG. 2 illustrates in greater detail the biometric identification system 10 of the present invention. With more particularity, whether during enrollment or identification/recognition stages, the feature extraction stage 30 (FIG. 1) of system 10 receives the sensed user responses such as low level behavioral responses 12, 20 including, but not limited to: speech signals, and EEG signals 75 after application of audio, visual or olfactory stimuli 78. These response signals 75 are input to signal processing algorithms, for example, executing in an interpreter device 60, that process these low level behavioral responses. It is understood however, that other types of user responses may be measured. For example, other types of higher level features may be extracted such as, for example, user responses 12, 20 in the form of answers 80, to questions or tests. For example, a psychological test may be administered to the user and those higher level answers processed in interpreter 60 using, for example, the "big five" personality clustering criterion to generate a five element feature vector. Details regarding the five personality clustering criterion may be found in the Costa, P. T., Jr., and McCrae, R. R. "*NEO PI-R: Professional Manual*" Odessa, Fla.: Psychological Assessment Resources (1992) incorporated by reference as if fully set forth herein. The modeling and matching may be performed in system 10 in numerous ways, including but limited to: statistical methods, e.g. by modeling, deterministic, or machine learning. For example, in the above example of using psychological personality testing, the five element feature vector itself may serve as the model 40, and matching can be performed simply by calculating the Euclidean distance between the exhibited features and the stored features (which in this case serve as the user model). For this example, the procedure is performed as follows: A user first enrolls by participating in a personality analysis test, resulting in the "big five" feature vector (not shown). Subsequently, when the user needs to gain access to a secure resource he/she will be verified by again receiving a personality test, and a verification determination 50 is made, for example, by measuring the Euclidean distance between the new "big five" feature vector and the one generated during enrollment. If the distance exceeds a predetermined threshold, the user will be rejected, and accepted otherwise. Another example or user responses 12, 20 may be the user's dialog path in a conversational system. For this example the user's navigation history through voice dialogs may be recorded and features extracted from it (for example, average number of turns to accomplish a task, verbosity, etc.). If the user's dialog features matches the enrollment features (e.g., the user is as verbose and navigates through similar dialogs) she/he will be accepted, and rejected otherwise. Alternately, for identification purposes (rather than verification), the system 10 may determine the user's identity to be the one that best matches the recorded dialog navigation behavior.

Another embodiment of the user enrollment/recognition in the system 10 of the invention, is the case where the system asks the user a sequence of yes/no questions 79 or binary selection questions. The answers 80 may then form a bit vector (not shown) which can serve as the model for that user. More generally, the system could ask non-binary questions, but could interpret the answers as binary, i.e. in one set or its complement. Another example is to use word associations where the responses sequence to a word sequence stimulus may be categorized according to some previously determined classes. As previously mentioned herein, alternatively the response may be measured in terms of EEG signals recorded from the scalp according to the international electrode 10–20 positioning system, or the measured polygraph sensor response signals. These conditional response signal values 75 then form a vector which are then stored in a pattern template and used for later comparison similar to the previous example.

As further shown in FIGS. 1 and 2, during recognition, the system 10 presents different stimuli to the user, records the user's emotional/behavioral response, and matches it to the response recorded during enrollment. The system may present stimuli that are different from the ones used during enrollment, however, are expected to inflict similar emotions and still be able to determine the user's identity. The system may, for example, utilize an explicit emotion detector or like sensing device 22 for this purpose. The indication of the user's identity is the consistency of the emotional and behavioral response between enrollment and recognition. For this purpose, simply measuring emotional cues (or any set of features that are emotionally and behaviorally indicative) and comparing them is sufficient, and an explicit emotion detector may not be required. In other words, the scope of the invention includes embodiments that exceed matching emotional and behavioral labels, and includes matching any measured features that convey emotional and/or behavioral information. For instance, further to the previous example, during a verification/recognition phase, the system may ask the same or similar binary questions as during the enrollment phase. The answers form a bit vector and its Hamming distance to the enrolled models are used to select among or judge the match to models in the database. Alternatively the response measured as a set of EEG signals conditioned on the stimulus is compared to previously stored EEG template measured during enrollment based on same or similar stimulus.

It should be understood that the method and apparatus of the present invention may be used to blindly identify a person's identity by searching for a behavioral profile that best matches the user's behavioral response to presented stimuli, either by direct match or a projected match.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

The invention claimed is:

1. A method for determining the identity of a person comprising:
   a prior enrollment stage including steps of:
   a) applying a stimulus to a user of the person to be identified;
   b) applying a sensor means for detecting one or more of that user's emotional, behavioral or physiological response to said stimulus;
   c) generating a model representing that user's emotional, behavioral or physiological response to said stimulus and storing said model; and,
   a subsequent recognition stage including the step of:
   d) presenting said stimulus to the user to be identified;
   e) detecting one or more of that user's emotional, behavioral or physiological response to said stimulus;
   f) comparing said emotional, behavioral or physiological response with said stored user's model representing the emotional, behavioral or physiological response for that user; and,
   g) determining whether said user is the same if a match exists as a result of said comparison,
   wherein said sensor means for detecting a user's behavioral response comprises an Electroencephalograph (EEG), wherein said user's response comprises EEG signals.

2. The method for determining the identity of a person as claimed in claim 1, wherein said stimulus comprises one or more from the group comprising: audio, visual and olfactory stimuli.

3. The method for determining the identity of a person as claimed in claim 1, wherein said stimulus comprises one of: speech or spoken words stimuli.

4. The method for determining the identity of a person as claimed in claim 1, wherein said stimulus comprises administration of a psychological profile test.

5. The method for determining the identity of a person as claimed in claim 1, wherein said user's emotional response characteristics includes one or more of: audible emotional cues or visual emotional cues.

6. A method for determining the identity of a person comprising:
   a prior enrollment stage including steps of:
   a) applying a stimulus to a user of the person to be identified;
   b) applying a sensor means for detecting one or more of that user's emotional, behavioral or physiological response to said stimulus;
   c) generating a model representing that user's emotional, behavioral or physiological response to said stimulus and storing said model; and,
   a subsequent recognition stage including the step of:
   d) presenting said stimulus to the user to be identified;
   e) detecting one or more of that user's emotional, behavioral or physiological response to said stimulus;
   f) comparing said emotional, behavioral or physiological response with said stored user's model representing the emotional, behavioral or physiological response for that user; and,
   g) determining whether said user is the same if a match exists as a result of said comparison,
   wherein said sensor means for detecting a user's physical behavioral response characteristics includes a polygraph machine, said user's response comprising polygraph measurement signals.

7. The method for determining the identity of a person as claimed in claim 1, wherein said comparing step f) includes evaluating how consistent the user's response is to similar stimuli as previously applied during said enrollment stage.

8. A system for determining the identity of a person, comprising:
   a) means for applying a stimulus to a user of the person to be identified during a prior enrollment stage and during a subsequent recognition stage;
   b) means for detecting one or more of that user's emotional, behavioral or physiological response during both said enrollment and subsequent recognition stages;
   c) means for generating a model representing that user's response to said stimulus during said prior enrollment stage and storing said model; and
   d) means for comparing said user's emotional, behavioral or physiological response with said stored user's model representing the response for that user, whereby an identity of said user maybe confirmed if a match exists as a result of said comparison,
   wherein said sensor means for detecting a user's physical response characteristics includes an Electroencephalograph (EEG), said behavioral response comprising EEG signals.

9. The method for determining the identity of a person as claimed in claim 7, wherein during said enrollment stage, said generated model includes a data structure representative of said user's behavior, and during said recognition stage, said step of generating a data structure representing said user's detected behavioral response, wherein said step of evaluating consistency of the user's response including the step of determining a distance between said stored data structure generated during enrollment and said data structure obtained during said recognition.

10. The system for determining the identity of a person as claimed in claim 8, wherein said stimulus comprises one or more from the group comprising; audio, visual and olfactory stimuli.

11. The system for determining the identity of a person as claimed in claim 8, wherein said stimulus comprises administration of a psychological profile test.

12. The system for determining the identity of a person as claimed in claim 8, wherein said means for detecting a user's response comprises a sensor means for detecting a user's emotional or physical response characteristics, said user's emotional response characteristics including one or more selected from the group comprising; audible emotional cues or visual emotional cues.

13. A system for determining the identity of a person,
  a) means for applying a stimulus to a user to be identified during a prior enrollment stage and during a subsequent recognition stage;
  b) means for detecting one or more of that user's emotional, behavioral or physiological response during both said enrollment and subsequent recognition stages;
  c) means for generating a model representing that user's response to said stimulus during said prior enrollment stage and storing said model; and
  d) means for comparing said user's emotional, behavioral or physiological response with said stored user's model representing the response for that user, whereby an identity of said user may be confirmed if a match exists as a result of said comparison,
  wherein said sensor means for detecting a user's physical response characteristics includes a polygraph machine, said behavioral response comprising polygraph measurement signals.

14. The system for determining the identity of a person as claimed in claim 8, wherein said means for comparing said user's response with said stored user's model includes evaluating how consistent the user's response is to similar stimuli as previously applied during said enrollment stage.

* * * * *